No. 703,670. Patented July 1, 1902.
R. F. C. RAMBEAUD.
COUPLING FOR RAILWAY WAGONS, &c.
(Application filed Oct. 11, 1901.)
(No Model.) 3 Sheets—Sheet 1.
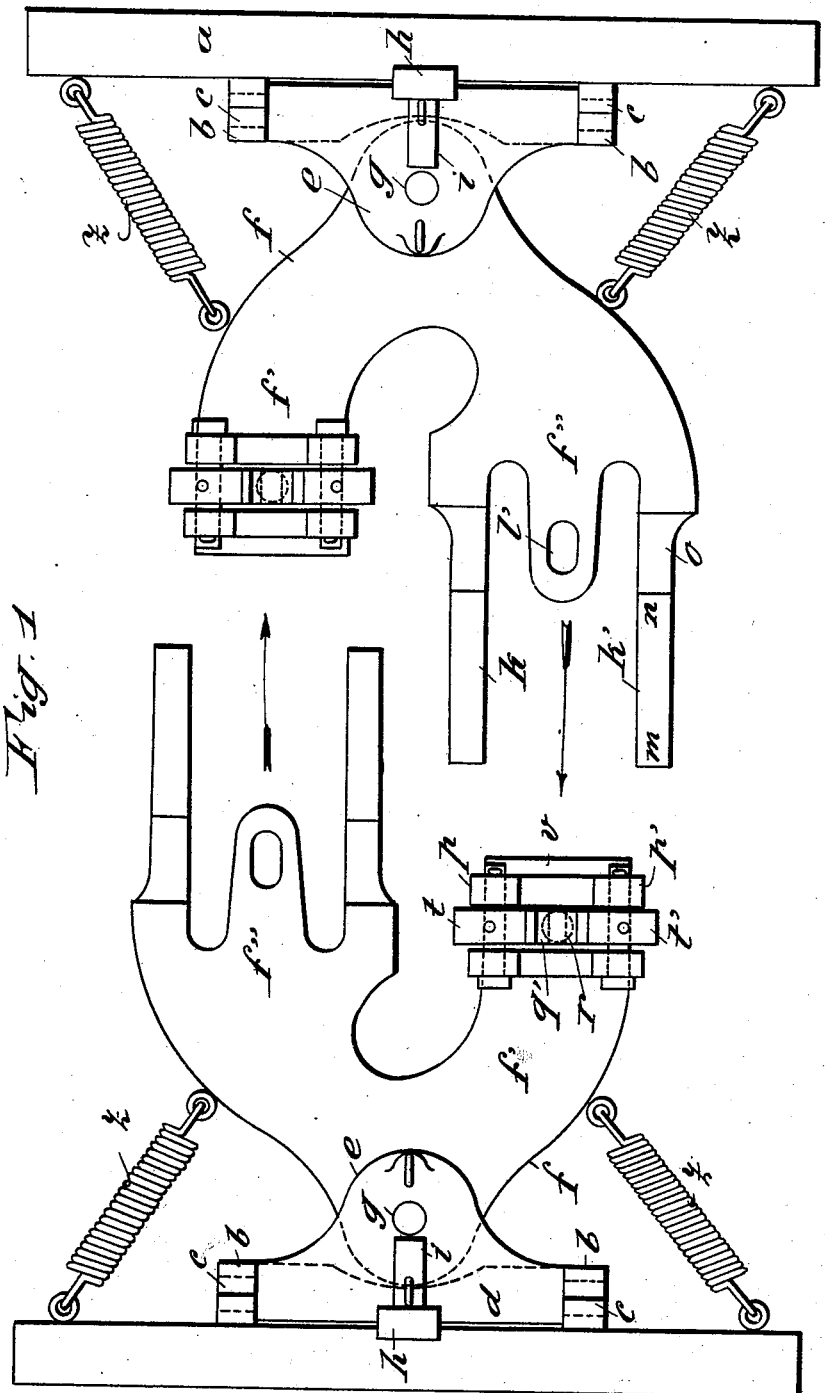

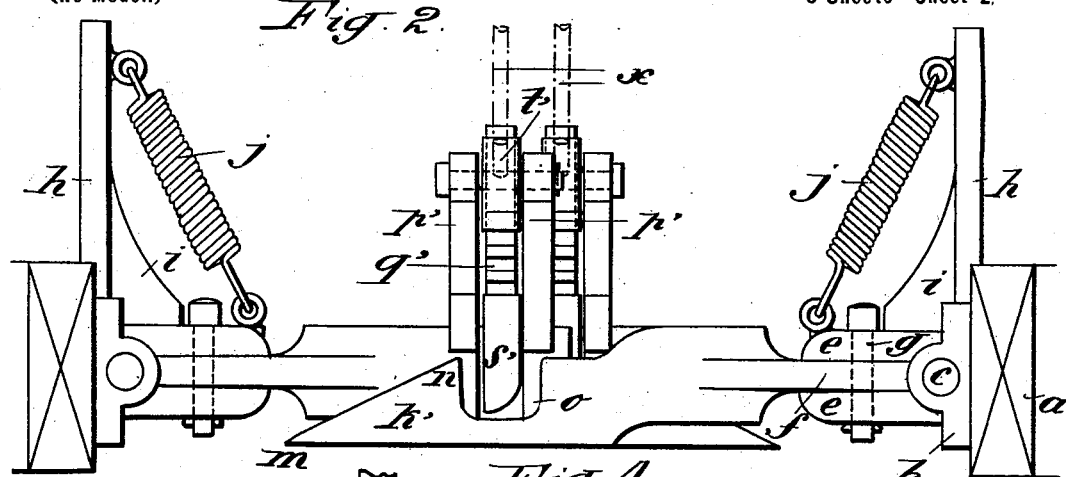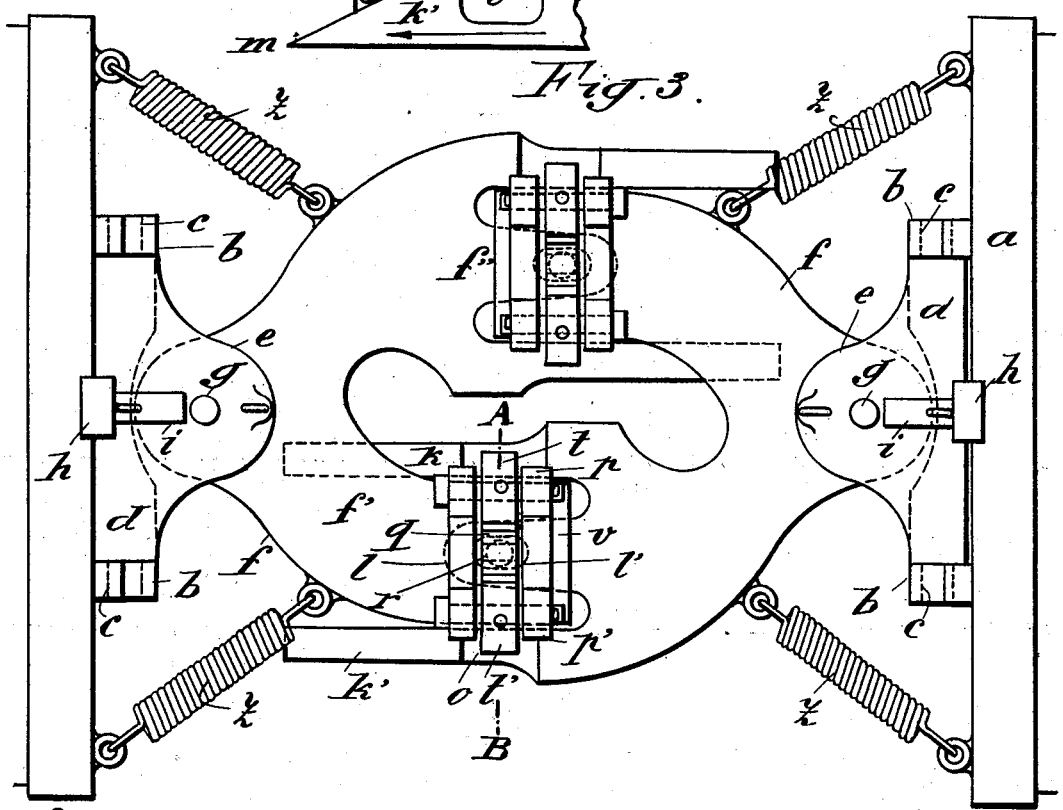

No. 703,670. Patented July 1, 1902.
R. F. C. RAMBEAUD.
COUPLING FOR RAILWAY WAGONS, &c.
(Application filed Oct. 11, 1901.)
(No Model.) 3 Sheets—Sheet 3.
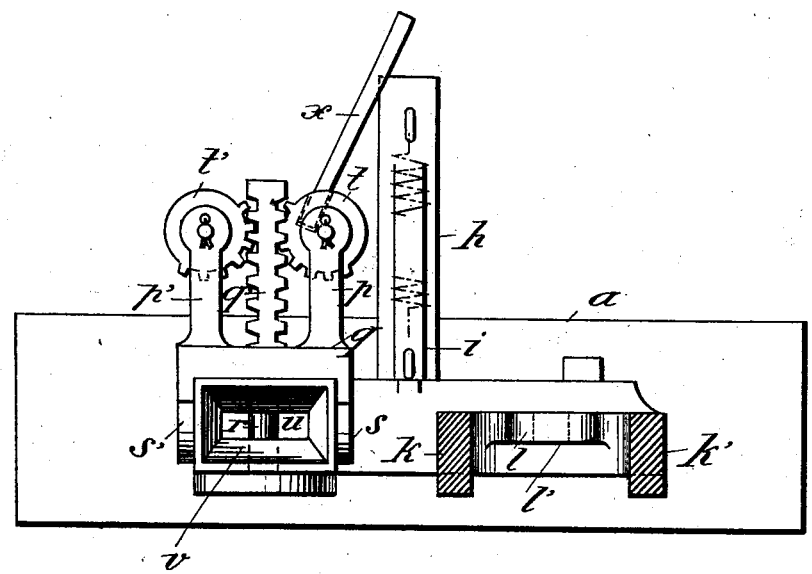
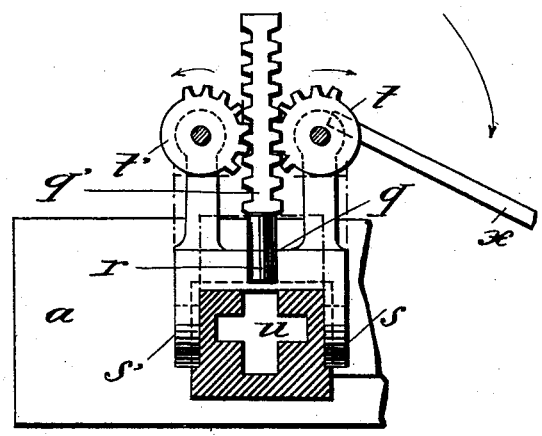
Witnesses:
C. W. Clement
A. Mitchell
Inventor
René François Charles Rambeaud
per
B. Singer
Attorney

UNITED STATES PATENT OFFICE.

RENÉ FRANCOIS CHARLES RAMBEAUD, OF PARTHENAY, FRANCE.

COUPLING FOR RAILWAY-WAGONS, &c.

SPECIFICATION forming part of Letters Patent No. 703,670, dated July 1, 1902

Application filed October 11, 1901. Serial No. 78,376. (No model.)

*To all whom it may concern:*

Be it known that I, RENÉ FRANCOIS CHARLES RAMBEAUD, a citizen of the French Republic, and a resident of Parthenay, Deux-Sèvres, France, have invented certain new and useful Improvements in Couplings for Railway-Wagons and the Like, of which the following is a specification.

This invention relates to an automatic coupling for railway-wagons and the like which operates automatically—that is to say, two wagons propelled one against the other will be forcibly coupled together. The safety-chains, if the law insists upon their usage, can be placed in position by the shunters without any danger or risk.

In the accompanying drawings, Figure 1 is a plan view showing the coupling open. Fig. 2 is a side elevation showing the coupling closed. Fig. 3 is a plan view showing also the coupling closed. Fig. 4 is a detail showing the means for automatically lifting the closing-latch. Fig. 5 is a section on A B of Fig. 3, showing the latch in its position when the coupling is made. Fig. 6 is also a section on A B of Fig. 3, but shows the latch in position for disengagement.

The frame of each vehicle is provided with a plate $a$, to which are fixed two bearings $b$, provided with two gudgeons $c$. The two gudgeons are integral with a spindle $d$, connecting two superposed and parallel flanges $e$ and leaving between them enough space for the end of a part $f$ to enter. A pin $g$ connects the part $f$ to the flanges $e$, while allowing the said tongue-piece a free movement. To the plate $a$ is fixed a vertical bar $h$, provided with a projection $i$, against which bears the upper flange $e$. A spring $j$ connects the top of the bar $h$ to the upper flange $e$, thus maintaining the two flanges against the projection $i$. This manner of assembling allows the vehicles to easily take the curves, each vehicle being able to make an angle very pronounced as regards the neighboring vehicles.

The before-mentioned part $f$ is divided into two parts $f'$ and $f''$. The branch $f'''$ is provided with a trident $k\, k'\, l$. The middle tooth $l$ is provided with an oval hole $l'$. The two lateral teeth are provided with raised edges $m\, n$ and a groove $o$, Figs. 2 and 4. The branch $f'$ is provided with upright parts $p$ and $p'$, Figs. 5 and 6, between which can move a part $q$, provided with three teeth $r\, s\, s'$. The said part $q$ is integral with a rack $q'$, provided on both sides with teeth and gearing with the toothed sectors $t\, t'$, supported by the frame $p\, p'$. The middle tooth $r$ passes into a chamber $u$, having inclined sides $v$, the outer teeth $s\, s'$ sliding along the outer sides of the chamber $u$.

If Fig. 1 be examined, it will be seen that when two couplings are placed one opposite to the other the branch $f'$ of one of the couplings is opposite to the branch $f''$ of the other. Now should the two couplings shown in Fig. 1 be brought close to each other it will be seen that the raised edges $m\, n$ of the teeth of the trident $k\, k'\, l$ lift up the vertical rods $s\, s'$, sliding against the outside of the chamber $u$. The upward movement of these vertical rods $s\, s'$ causes the uplifting of the parts $q$ and also the lifting of the central teeth $r$. Under these conditions the oval openings $l'$, made in the teeth $l$, will enter the chamber $u$ exactly below the latches $r$, and as soon as, owing to the displacement of the two couplings to each other, the vertical arms $s\, s'$ enter the slots $o$, Fig. 2, the whole of the part $q$ will be lowered by reason of its own weight, the bolts will enter the oval openings $l'$, and the coupling will thus be performed automatically. Should it be necessary to uncouple the wagons by means of a suitable lever $x$, an official can without quite passing between the two wagons cause the two toothed sectors $t\, t'$ to rotate, which will cause the parts $q$, owing to the toothed racks $q'$, to be moved upwardly. The bolts $r$ leave the holes $l'$, and if the wagons move in opposite directions they can be separated. As seen from the example shown in the drawings, it is owing to the weight of the parts $q$ that the coupling is effected automatically. It is clear that were these parts arranged laterally or beneath the same action could be effected by using suitable springs.

Owing to the pins $g$ the coupling acquires a great freedom of movement, and thus allows wagons to easily follow curves. Upon the sides are arranged four springs 3, which rapidly bring the couplings back to their initial position once the curve has been passed.

Having now fully described my invention, what I claim, and desire to secure by Letters Patent, is—

1. In an automatic coupling for railway-wagons and the like, the combination with a plate fixed to the frame of each wagon and provided, by means of two bearings, with a shaft connecting two superposed flanges, of a vertical bar fixed to the before-mentioned plate, a spring fixed, on the one hand, to the said vertical bar and on the other to the upper flange, and a part placed between the two said flanges and connected thereto by a vertical pin around which the said part may oscillate horizontally, the said part being divided into two branches as described and as shown.

2. In an automatic coupling for railway-wagons and the like, the combination with a plate fixed to the frame of each wagon and provided, by means of two bearings, with a shaft connecting two superposed flanges, of a vertical bar fixed to the before-mentioned plate, a spring fixed on the one hand to the said vertical bar and on the other to the upper flange, and a part placed between the two said flanges and connected thereto by a vertical pin, around which the said part may oscillate horizontally, the said part being divided into two branches, one of the said branches forming a trident the middle tooth thereof being provided with an oval hole and the two side teeth with raised edges and a groove engaged by a fastening-bolt, the said trident being provided with vertical parts, between which move double racks integral with the fastening-bolt, two toothed sectors movably attached to the frame and meshing with the said double racks, a central chamber into which enters the central tooth of the said part, the outer teeth sliding upon the outside of the chamber and arranged so as to be lifted by the raised edge of the teeth of the trident of the device fixed to the neighboring wagon and falling into the slot of the central tooth of the coupling on the following wagon, substantially as described and as shown.

3. In an automatic coupling for railway-wagons and the like, the combination with a plate fixed to the frame of each wagon and provided, by means of two bearings with a shaft connecting two superposed flanges, of a vertical bar fixed to the before-mentioned plate, a spring fixed, on the one hand, to the said vertical bar and on the other to the upper flange, and a part placed between the two said flanges and connected thereto by a vertical pin, around which the said part may oscillate horizontally, the said part being divided into two branches, one of the said branches forming a trident, the middle tooth thereof being provided with an oval hole and the two side teeth with raised edges and a groove engaged by a fastening-bolt, the said trident being provided with vertical parts between which move double racks integral with the fastening-bolt, two toothed sectors movably attached to the frame and meshing with the said double racks, a central chamber into which enters the central tooth of the said part, the outer teeth sliding upon the outside of the chamber, means for raising said racks and freeing the central tooth and springs causing the coupling to return into its original position when a curve has been passed, substantially as described and as shown.

In testimony whereof I have hereunto set my hand in presence of two witnesses.

RENÉ FRANÇOIS CHARLES RAMBEAUD.

Witnesses:
F. GILLIET,
L. CANEYIAN.